Dec. 12, 1950   J. F. MORAN   2,533,603
BUILDING BLOCK MOLDING APPARATUS
Filed May 7, 1948

INVENTOR.
JOHN F. MORAN
BY
Warren S. Oxton
ATTORNEY

Patented Dec. 12, 1950

2,533,603

UNITED STATES PATENT OFFICE 2,533,603

BUILDING BLOCK MOLDING APPARATUS

John F. Moran, Brooklyn, N. Y.

Application May 7, 1948, Serial No. 25,623

8 Claims. (Cl. 25—121)

The invention relates to molding apparatus for manufacturing concrete and similar molded building blocks of the double-walled or double-slab type and which slabs are integrally held together by a tie member, preferably a metallic tie member bridging across an air space formed between the slabs. The disclosures herein are particularly designed for use in molding the multiple wall building blocks disclosed in my co-pending application entitled Multiple Wall Building Block, Serial No. 14,084, filed March 10, 1948.

It is noted that the blocks featured in the pending application are characterized by a broad strip metal tie plate formed of steel and the ends of which are embedded in the concrete and the portions bridged across the space or spaces between the walls or slabs are flush with the top face of the block. It is a practical requirement of such blocks that when in their final forms the tie plates must be accurately set in their desired prelocated position relative to the molded slabs or walls and disposed in such way that, while the bridging portion be exposed at one face of the block and thus accessible for handling, the anchoring end portions should be firmly embedded deep in the concrete.

In order to mold any such form of block it is obviously necessary to pre-locate the tie plate somehow in the mold and that the tie plate be anchored in the mold against accidental displacement, but this is complicated in the instant case by the necessity of locating the required mold cores in cooperative relation to the prelocated tie plate and it is to this feature that this disclosure is particularly directed.

The primary object of the invention then is to provide a simple and practical form of molding apparatus for molding multi-walled building blocks wherein the tie members are located so that the bridge portion is exposed in juxtaposition to a face of the block and the ends of the tie members are firmly anchored within the block.

Broadly, this objective is attained first by molding the block upside down to thus bring the tie plates flush with the desired accurately formed top of the block when inverted after its removal from the finished mold; then by anchoring the tie plates on the pallet or bottom of the mold in such way as to insure their proper location in the finished structure; and third, by using shiftable and replaceable mold cores which can be displaced to permit ready access to the tie plates and which cores can then function to provide the necessary mold partitions to divide the interior of the mold cavity into molding compartments and thus locate the molding slabs relative to the pre-located tie plates or equivalent metallic tie members.

Various other objects and advantages of the invention will be in part obvious from an inspection of the accompanying drawings and will be more fully set forth in the following particular description of two forms of molding apparatus embodying the invention, and the invention also consists in certain new and novel features of construction and combination of parts hereinafter set forth and claimed.

It will be understood that the mold parts herein illustrated are intended to show novel parts of somewhat complicated block-molding apparatus now on the market. The invention disclosed in Figs. 1–3 is intended to be used in any standard tamping and strike-off concrete block machine.

Figure 3:
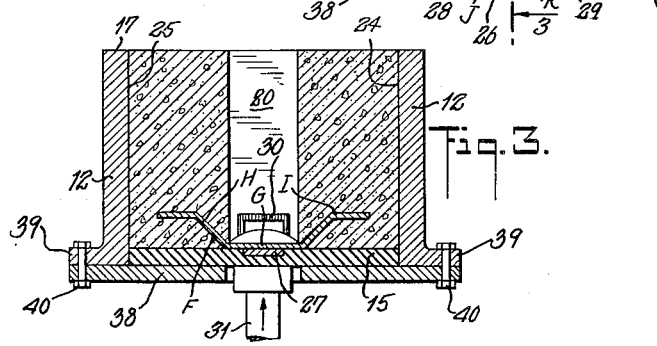
Fig. 3 is a vertical transverse sectional view taken on the line 3—3 of Fig. 2 with the concrete filler in place, with the top of the concrete leveled off and the finished block ready to be removed from the mold and associated machine.
Figure 4:
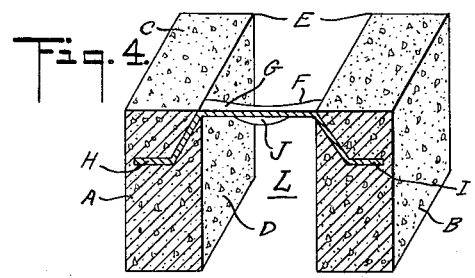
Fig. 4 is a view of one half of the finished block as formed by the apparatus shown in the preceding figures.

In the accompanying drawings and referring first to the block molded in the apparatus herein featured, as one-half of such block is shown in Fig. 4, there is disclosed two upstanding half slabs or walls A and B disposed in parallel, spaced-apart relation with an open air space therebetween. It is understood that the complete block is twice as long as is shown and that the half not shown is identical with the half shown in Fig. 4. The top faces C of the slabs are disposed in the same horizontal plane and parallel to the plane which defines the bottom of the unit. The inner side faces of the slabs in each case intersect the associated top faces C to form in each case an inner, upper squared edge E. The full length slabs are permanently coupled together by a tie member F. The molding apparatus herein featured is particularly designed to form these edges in definite relation to their associated tie members. The tie member illustrated is formed from a flat strip of steel with a central bridge-forming and handle-forming portion G and with Z-shaped angled end-forming portions H and I for the most part deeply embedded respectively in the walls or slabs A and B. The bridge-forming portion G is U-shaped in cross section as shown in Fig. 3 and is waist-shaped in plan, as shown in Fig. 1, all as is more particularly described and claimed in the above identified application.

Figure 1:
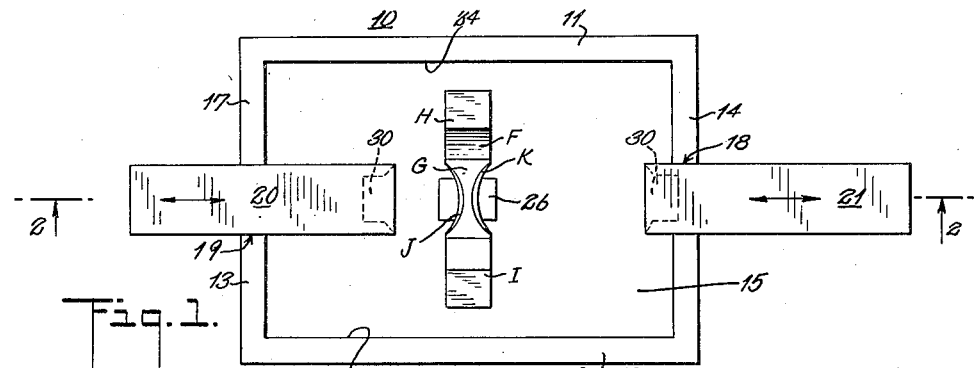
Fig. 1 is a plan view looking down upon a preferred embodiment of the invention with the tie plate located in place in its saddle on the pallet and the cores partially withdrawn to permit access to the saddle.

In the showing in Figs. 1 and 3, there is disclosed a box-like overhead mold or box 10 which provides a four-walled rectangular frame open at top and bottom and including a pair of long walls 11 and 12 integrally connected at opposite ends by a pair of relatively short walls 13 and 14 and a bottom plate 38 at least partially closes the open bottom of box 10. The bottom plate 38 is secured to outstanding flanges 39 projecting from the sides 11 and 12 and fastened by bolts 40. A readily removable flat, plate-like pallet 15 is fitted in the open bottom and rests on the bottom plate 38. Preferably both the box and the pallet is formed of steel. The upper surface 16 of the pallet in the portion thereof within the box is machined more or less accurately to provide in the finished block the desired flat top faces C in a plane perpendicular to the upright dimensions of the block and also to define a plane exactly parallel to the strike-off plane defined by the leveling top 17 of the mold.

Figure 2:
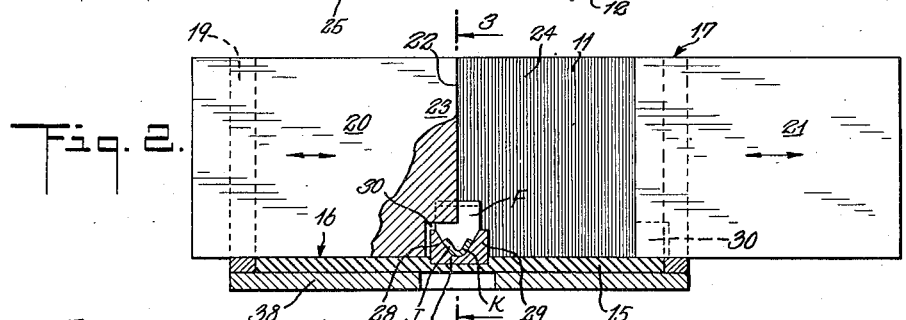
Fig. 2 is a vertical sectional view taken in the longitudinal medial plane of the mold and taken on the line 2—2 of Fig. 1, with the left core advanced to its partition-forming position overlapping one half of the tie member and with a part of the left core broken away to show the recess for receiving a one-half side of the saddle and tie plate.

The short sides 14 and 13 are provided at their mid-lengths respectively with core-receiving upright side openings 18 and 19 which extend from the level of the surface 16 to the upper edges 17 as best shown in Fig. 2. Slidably mounted in the openings 19 and 18, respectively, are upstanding cores 20 and 21. These cores are rectangular plates preferably hollow to economize in material and to make them sufficiently light in weight to be moved easily. The cores may be moved into and out of the interior of the mold 10, either manually or preferably by mechanical power coupled to the other mechanism of the associated machine, not here necessary to show.

The cores are dimensioned to provide the desired spacing apart of the slabs A and B in the finished block to form the intervening rectangular air space L shown in Fig. 4. The cores are provided for the most part with flat upstanding abutting edges 22 and when in contact coact to form a partition 23 dividing the interior of the mold into two rectangular slab-molding cavities 24 and 25.

The pallet 15 is provided centrally thereof and just below the plane where the edges 23 abut, as best shown in Fig. 2, with a saddle 26 for locating the tie member F. This saddle includes a flat, strip-like portion 27 embedded in the surface 16 of the pallet and spot-welded in place.

The saddle includes a pair of sides 28 and 29 which extend in upwardly spaced-apart relation from the flat portion and form therewith a long socket. The upper face or cradle of the saddle is U-shaped in cross-section and is dimensioned transversely to receive the U-shaped bridge-forming portion G in snug-fitting relation, as shown in Fig. 2. The lowermost rounded portion of the cradle of the saddle as shown in Fig. 2 is in the plane of the upper or molding face of the pallet, so that in the finished block the bridge-forming portion G will be in the plane containing the top faces C. The saddle is dimensioned lengthwise with arched sides, with their convex sides facing each other to fit the biconcave form of the portion G and thus act to resist longitudinal shifting of the tie member as shown in Fig. 1.

The lower portions of the abutting edges 23 of each of the cores are recessed as shown at 30 to overlap the saddle and tie plate F as shown in Fig. 2. As shown in dotted lines in Fig. 1, the recesses 30 are each dimensioned at their central portions to receive the adjacent half of the saddle and the recesses have their outer sides beveled to facilitate the centering of the advance edges of the cores about the adjacent sides of the saddle. The outer, unrecessed bottom portions of the edges 22 bear vertically on the tie plate engaging the same in the substantially flat portions thereof where the flanges J—K round into the ends of the bridge-forming portion G. In this way the weight of the cores operates to bear on the tie member, as shown in Fig. 3, to keep the same firmly seated in its saddle during the molding operation.

In operation, the pallet 15 is lowered into position to rest on the bottom plate with the cores outwardly offset. The pallet 15, either before or after being located in the mold, is equipped with a tie member as by dropping the same into the socket provided therefor between the sides 28—29. Concrete or similar moldable material is flowed into the cavities 24 and 25 and tamped down; and the surplus material leveled off flush with the flat top edges 17. The cores are then removed and the plunger 31 is actuated to lift the pallet and with it the molded block from the mold. After the block has been partially cured it is removed from the pallet and when sufficiently cured or otherwise ready for use may be conveniently lifted by means of the handle provided by the exposed bridge-forming portion G.

I claim:

1. In a mold construction for forming multiple-walled building blocks of moldable material and in which the walls are connected by a metallic tie member whose mid-portion is U-shaped in cross section and waist-shaped in plan, comprising an open-bottom form, a shiftable pallet closing the open bottom of the form, a saddle secured to the pallet at its center, said saddle provided with an upwardly-facing socket U-shaped in cross section and waist-shaped in plan for receiving the mid-portion of the tie member and acting to resist lengthwise shifting of the tie member from the saddle and a plunger for moving the pallet through the form.

2. The mold construction defined in claim 1 which includes means shiftable relative to the form into position above and offset from the saddle and operative to engage portions of the tie member and to hold the same against the top of the pallet and thus secure the tie member in its preset position in the socket.

3. In an apparatus for manufacturing concrete blocks of the double-walled tied-together type and wherein a tie member connects the upper faces of walls, the combination of a one-piece mold box open at top and bottom and including four connected outlining side walls, a solid steel pallet closing the open bottom of the box, the upper surface of the pallet machined flat and providing a molding surface for defining the eventual top faces of both walls of the completed block, an opposing pair of the side walls each provided with an opening extending from the level of said machined upper pallet surface to the top of its associated side, a pair of cores, one for each opening, fitted therein, slidably mounted therein, slidable on top of the pallet and having their top faces in the plane of the open top of the mold block and adapted when their inner edges are in abutting relation adjacent the center of the block to form a two-part partition extending across the interior of the box and dividing the same into two molding compartments, a tie-mounting saddle secured to the pallet at the place where the inner edges of the cores meet, said saddle fashioned to prelocate a tie member in the apparatus where such tie member should be located to bring the member at the top of the finished block and said cores each having its meeting edge recessed at its junction with the pallet with each recess facing the pallet and each other, and contoured to receive and overlap the adjacent portion of the saddle when the cores are in their abutting partition-forming position.

4. The apparatus defined in claim 3 and in which the cores when in abutting relation coact to form a partition, each core having a portion overlapping the tie member when seated in the saddle and bearing on the member exteriorly of the saddle to maintain the tie member in its preset position seated in the saddle.

5. In a metallic mold construction for molding concrete blocks and the like, the combination of a one-piece four-walled molding box open at top and bottom, a bottom plate for closing the bottom of the box, a steel pallet normally resting on the bottom plate and fitted to the box to close its open bottom, a pair of opposite walls of the box provided with side openings extending from the upper surface of the pallet to the tops of the walls, a pair of cores, one for each opening and slidable therein across the top of the pallet, said cores adapted to be moved towards each other and into abutting relation to form a two-part partition dividing the interior of the box into two molding cavities, said pallet provided centrally thereof and in line with the abutting edges of the cores with a steel saddle for locating a tie member in the mold construction, said saddle having a central portion fixedly welded to the steel pallet and having a pair of upstanding sides forming therebetween a long upwardly-facing socket U-shaped in vertical cross section and with the sides facing each other and curved and the meeting edges of the cores when in abutting relation disposed in overlapping relation parallel to the longitudinal medial plane of the saddle.

6. In a mold construction for molding concrete and like building blocks of the type which includes two parallel, spaced-apart slabs having their top faces in a common plane and with a metallic tie plate connecting the slabs at their upper faces, said construction including a mold open at its top and provided with a partition to form two spaced-apart molding cavities, a pallet for closing the open bottoms of the two cavities and having a smooth molding surface facing the molding cavities, a tie plate receiving saddle secured to the pallet in the part thereof which lies between the bottoms of the cavities, said saddle including an upwardly-facing plate-receiving pocket whose lower face coincides substantially with the plane of the molding surface of the pallet thereby to bring the central portion of the tie plate flush with the plane of the top surfaces of the slabs, said saddle fashioned to receive the tie plate and to locate it to bring its ends into the mold cavities.

7. The mold construction defined in claim 6 which includes shiftable means operatively connected to the pallet to move the same to and from its position closing the open bottoms of the molding cavities.

8. In a mold construction for molding concrete and like blocks of the type which include two parallel spaced-apart walls with a tie member having its ends embedded in the walls to connect them together as a unit, said construction including cavity-forming means for forming the two walls and for finishing the eight upstanding faces of the walls, a pallet having a flat surface facing said means for forming another face of each wall, a saddle secured to the pallet and fashioned for receiving the tie member, said saddle including a flat strip-like portion embedded in the pallet and a pair of sides extending upwardly from the flat portion and from the pallet to form a long socket whose upper face is U-shaped in cross section and whose sides are arched towards each other to give the socket a biconcave form when viewed in plan.

JOHN F. MORAN.

REFERENCES CITED

The following references are of record in the file of this patent:

UNITED STATES PATENTS

| Number | Name | Date |
| --- | --- | --- |
| 961,659 | Taylor | June 14, 1910 |
| 1,063,293 | Searls | June 3, 1913 |
| 1,241,487 | Atterbury | Oct. 2, 1917 |
| 1,497,440 | Guy | June 10, 1924 |
| 1,721,017 | Gurney et al. | July 16, 1929 |
| 1,853,720 | Bruckner | Apr. 12, 1932 |
| 1,919,807 | Sharpe | July 25, 1933 |
| 2,280,635 | Ishman | Apr. 21, 1942 |